United States Patent [19]

Schieber

[11] Patent Number: 4,704,327

[45] Date of Patent: Nov. 3, 1987

[54] POLYGRANULAR CARBON MEMBER

[75] Inventor: Franz Schieber, Röthenbach a.d.Pegnitz, Fed. Rep. of Germany

[73] Assignee: C. Conradty Nurnburg Gmbh & Co. KG, Pegnitz, Fed. Rep. of Germany

[21] Appl. No.: 761,467

[22] Filed: Aug. 1, 1985

[30] Foreign Application Priority Data

Sep. 24, 1984 [DE] Fed. Rep. of Germany ....... 3435043

[51] Int. Cl.$^4$ ............................................. B32B 9/00
[52] U.S. Cl. ................................... 428/338; 264/119; 428/332; 428/408
[58] Field of Search ............... 428/408, 323, 402, 281, 428/286, 338, 332; 427/249; 156/327; 264/119

[56] References Cited

U.S. PATENT DOCUMENTS

| | | | |
|---|---|---|---|
| 3,174,895 | 3/1965 | Gibson et al. | 428/286 |
| 3,579,401 | 5/1971 | Canville et al. | 156/327 |
| 3,969,124 | 7/1976 | Stewart | 427/249 X |
| 4,234,650 | 11/1980 | Schieber | 428/408 |
| 4,279,952 | 7/1981 | Kodama et al. | 428/281 |
| 4,515,856 | 5/1985 | Matsumoto | 428/323 |
| 4,559,862 | 12/1985 | Case et al. | 428/323 X |

FOREIGN PATENT DOCUMENTS 494245 9/1967 France .................................. 156/327

*Primary Examiner*—Thomas J. Herbert
*Attorney, Agent, or Firm*—Pennie & Edmonds

[57] ABSTRACT

The invention relates to a polygranular carbon member of granular or, respectively, pulerulant and/or fibrous carbon particles as filler materials and of a binder, which has been subjected to a thermal treatment for consolidation of the binder, as well as to a method of producing such a carbon member. That kind of a carbon member is to be dimensionally stable, self-supporting and rigid also in the case of extremely low wall thicknesses and relatively large surface area dimensions, and it is to be able to be produced economically. For this purpose, it is suggested according to the invention that carbon materials, such as coke, carbon black, carbon filters, natural or synthetic graphite and the mixtures thereof, are incorporated as filler material, and that the carbon member has at first, prior to the thermal treatment and under the influence of shearing forces, been shaped from a plastic carbon composition (mass) with a carbonaceous, cokable binder content of from 50 to 150% by weight, based on the filler material, into a thin, plate-shaped member and through the subsequent thermal treatment into a sheet-like article of a specific configuration.

17 Claims, No Drawings

POLYGRANULAR CARBON MEMBER

BACKGROUND OF THE INVENTION

The invention relates to a polygranular carbon member of granular or, respectively, pulverulent and/or fibrous carbon particles as filler material and of a binder, which has been subjected, for consolidating the binder, to a thermal treatment, as well as to a method of producing it.

DESCRIPTION OF THE PRIOR ART

Polygranular carbon members of the type as mentioned are produced, for example, by means of compression molding and extrusion molding. Such members are, however, too compact for many possibilities of use because on account of strength reasons relatively great wall thicknesses are required for large surface-area members. That is why it was necessary so far to revert to other measures in case where relatively large surface area members of low wall thicknesses were required, for example for reasons having to do with weight saving.

It has already been suggested to impregnate, for the purpose of producing thin, plate-shaped carbon members, graphite fabrics with a binder, to layer several such fabric layers above one another and to coke the binder. This method, however, is disadvantageous because it requires much effort and leads to a relatively large number of rejects and, therefore, is costly.

Furthermore, large surface-area carbon members of single-layer or multi-layer carbon or graphite felts are known, which are immersed into a cokable binder, which is subsequently coked under pressure and heat.

It is quite generally known to produce carbon members in desired dimensions from solid carbon blocks by means of sawing-off and subsequent grinding. The work effort required therefore is evident and, moreover, there are close limits to the thickness of the member to be produced downwardly already for reasons having to do with working technique, so that for example large surface-area plates of a thickness of less than 2 mm already easily break when sawed off solid (massive) blocks. Particular difficulties are, however, in this connection encountered in the production of thin-walled uneven members.

SUMMERY OF THE PRESENT INVENTION

Therefore, it is an object of the invention to provide a polygranular carbon member of low wall thickness and large surface area dimensions, which is dimensionally stable, self-supporting and rigid.

It is a further object to provide a polygranular carbon member of that type, which can be produced in a far more economical manner than by being worked out of thick, solid carbon blocks.

It is another object to provide a method for producing such a carbon member in an economical way.

These objects are accomplished according to the invention in that as filler material carbon materials such as coke, carbon black, carbon fibers, natural or synthetic graphite and the mixtures thereof are incorporated, and in that the carbon member has been shaped prior to the thermal treatment and by the action of shearing forces from a plastic carbon composition (mass) having a content of from 50 to 150% by weight of cokable binder, based on the filler material, at first into a thin, plate-shaped member and by a subsequent thermal treatment into a rigid, dimensionally stable, sheet-like structure of specific configuration.

Hence, the essential feature of the polygranular carbon member according to the invention is the use of a plastic carbon composition of specific, carbonaceous filler materials having a relatively high proportionate amount of carbonaceous binder, which is exposed to shearing forces, so that a thin, plate-shaped structure results, which thereupon is either as such or after a further deformation subjected, for the purpose of producing specific desired concrete space configurations, to a temperature treatment by which the binder is condensed or coked, so that a sheet-like structure results.

Consequently, a method serves for producing the carbon member according to the invention, in which method a plastically deformable carbon composition is produced from granular or, respectively, pulverulent and/or fibrous carbon particles as filler materials, such as coke, carbon black, carbon fibers, natural or synthetic graphite and the mixtures thereof, and of a carbonaceous binder, which composition is shaped into thin plates by being passed once or several times through a roll gap (nip) in a single or in changing directions under the influence of shearing forces, which plates are as such or after further deformation subjected to a temperature treatment for the purpose of producing specific concrete space configurations and in that way obtain their rigid, sheet-like character.

DETAILED DESCRIPTION OF THE PRESENT INVENTION

Any desired carbonaceous filler materials can be utilized in the method according to the invention, for example, cokes, carbon blacks and short carbon fibers. It has surprisingly been found in that connection that all of these filler materials in mixtures with very high proportions of carbonaceous binders do not only result in very good deformability in the roller frame but, rather, also exhibit a very good annealing behaviour, without crack development and rejects.

According to an advantageous embodiment of the carbon member, the individual thin layers of the multi-layer member have been adhesively joined together through additional carbonaceous binder and have been subjected to a further temperature treatment for coking the additional binder. In a multi-layer member, the direction of the structural orientation of the successive layers can change from layer to layer by an angle of between 0° and 180°.

When using carbon fibers as filler material, fiber lengths of between 1 to 10 mm have proved particularly serviceable.

Furthermore, it has turned out to be advantageous to adjust the binder content in a manner such that the binder after carbonization has a carbon residue of from 35 to 70% by weight.

The thickness of the single-layer, sheet-shaped material advantageously is between 0.1 and 5 mm.

For producing the carbon member, a plastically deformable composition (mass) of granular or, respectively, pulverulant and/or febrous carbon particles as filler materials and of a carbonaceous binder is produced at first. Phenol formaldehyde resins, furan resins, tar, pitch and/or a high-viscous cellulose suspension or the mixtures thereof may be utilized as binder. This deformable composition is rolled in an unheated roller frame, hence at about room temperature of 20° C., under the influence of shearing forces to thin, plate-shaped structures, whose thickness is between 0.1 and 5.0 mm. This rolled-out thin carbon material layer is either subjected to a further deformation to produce specific desired concrete space configurations and then undergoes a temperature treatment, or it is as such exposed to a temperature treatment, which consists in a customary coking or, respectively, graphitazition and in that way results in a thin, rigid, sheet-like member.

Rolling-out of the deformable composition in the roll gap (nip) may also take place in a manner such that the material is at first processed in one roller passage and is thereupon folded together once or several times and is again passed through the roller gap, viz., in the original longitudinal direction or in transverse direction, in which way the individual layers adhesively join together. This operation can be repeated several times until the desired material thickness is attained. The resultant, rolled-out, still plastically deformable composition can then, as already mentioned above, be shaped into members of any desired configuration or, respectively, can be continued to be shaped mechanically and is then subjected to a temperature treatment, the material thus becoming strong, rigid and dimensionally stable and obtaining its sheet-like appearance or, respectively, property.

Despite its being thin-walled, the finished polygranular carbon member is extraordinarily dimensionally stable and exhibits very good strength properties, which also in the case of larger surface-area dimensions have the effect that it is self-supporting. It may, for example, have the form of the following members:

plate: thickness of 1 mm, edge length of 300×600 mm
tube: wall thickness of 1 mm, diameter of 300 mm, length of 500 mm
open spiral: wall thickness of 1 mm, outside diameter of 80 mm, height of 50 mm, gaps of 1–2 mm
pen crucible: wall thickness of 1 mm, diameter of 50 mm, height of 50 mm In order to produce such a crucible, the thin, plastic, plate-shaped structure of not yet thermally treated carbon material is at first, as has already been explained in principle above, shaped into a tube, whose diameter corresponds to the diameter of the crucible intended to be obtained, and at the one end of which a bottom of the same thin material then is added by means of shaping or, respectively, is adhesively attached with the aid of the binder contained in the material. Thereupon, this "green" shaped article is subjected to the thermal treatment, i.e. is annealed at temperatures of between 700 and 1000° C., the binder thus being pyrolyzed under the formation of strong carbon bridges and volatile decomposition products.

What is claimed is:

1. A polygranular carbon member of granular or, respectively, pulverulent and/or fibrous carbon particles as filler materials and of a binder, which has been subjected to a thermal treatment at a temperature between about 700 and 1000° C. for carbonizing and consolidating the binder, that as filler material carbon materials such as coke, carbon black, carbon fibers, natural or synthetic graphic and the mixtures thereof are incorporated and that said carbon member has been configured prior to said thermal treatment and under the influence of shearing forces from a plastic carbon composition having a content of from 50 to 150% by weight of cokable binder, based on said filler material, at first into a thin, plate-shaped member and thereafter through said thermal treatment into a rigid, dimensionally stable, flexible, sheet-like structure of a specific configuration.

2. A carbon member as defined in claim 1 wherein the thickness of the single-layer sheet-like material is between 0.1 and 5.0 mm.

3. A carbon member as defined in claim 1 wherein the binder after carbonization includes a carbon residue of from 35 to 70% by weight.

4. A carbon member as defined in claim 1 wherein the carbon fibers have a length of between about 1 and 10 mm.

5. A carbon member as defined in claim 1 wherein a plurality of such thin, plate-shaped members have been adhesively joined together through carbonaceous binder to form a multi-layer member and have been subjected to a temperature treatment.

6. A carbon member as defined in claim 5 wherein in case of a multi-layer member the direction of structure orientation of the successive layers in relation to one another changes by angles of between 0 and 180°.

7. A polygranular carbon member having a filler material selected from the group consisting of granular, pulverent, fibrous carbon particles and mixtures thereof, and a binder, which carbon member has been subjected to a thermal treatment at a temperature between about 700 and 1000° C. for carbonizing and consolidating the binder, wherein the filler material comprises carbon materials such as coke, carbon black, carbon fibers, natural graphic, synthetic graphite, and mixtures thereof and that said carbon member has been formed prior to said thermal treatment under the influence of shearing forces by one or more rolling processes from a plastic carbon composition having a content of from 50 to 150% by weight, based on the filler material weight, of a cokable binder selected from the group consisting of phenol formaldehyde resins, furan resins, tar, pitch, a high-viscous cellulose suspension and mixtures thereof, at first into a thin, plate-shaped member of a thickness between about 0.1 and 5 mm and thereafter by said thermal treatment into a rigid, dimensionally stable, flexible, sheet-like structure of a specific configuration.

8. A polygranular carbon member consisting essentially of:
a carbon filler material; and
a binder in an amount of between about 50 to 150% by weight based on the weight of the filler material;
said carbon member being initially formed under the influence of shearing forces by one or more rolling processes to form a thin, plate-shaped member, followed by a subsequent thermal treatment at a sufficient temperature for carbonizing the binder and consolidating the composition into a rigid, dimensionally stable, flexible, sheet-like structure, said thermal treatment temperature being less than about 1000° C.

9. A carbon member as defined in claim 8 wherein the thickness of the sheet-like structure is between about 0.1 and 5.0 mm.

10. A carbon member as defined in claim 8 wherein the thermal treatment temperature is above about 700° C.

11. A carbon member as defined in claim 8 wherein the material comprises coke, carbon black, natural graphite, synthetic graphite or mixtures thereof.

12. A carbon member as defined in claim 8 wherein the filler material is in the form of granular, pulverent, or fibrous particles and mixtures thereof.

13. A carbon member as defined as claim 8 wherein the binder is a phenol formaldehyde resin.

14. A carbon member as defined in claim 8 wherein the binder is a furan resin, tar, pitch, a high-viscous cellulose suspension, or mixtures thereof.

15. A carbon member as defined in claim 8 wherein the thermal treatment carbonizes the binder to a carbon residue comprising 35 to 70 percent by weight of the carbon material.

16. A carbon member as defined in claim 15 in the form of one or a plurality of sheet-like structures.

17. A carbon member as defined in claim 16 in the form of multiple layers wherein successive layers are oriented by an angle of between 0 and 180°.

* * * * *